United States Patent [19]

Chamberlain et al.

[11] 4,251,363

[45] Feb. 17, 1981

[54] ANIONIC POLYMERIC FLOCCULANT COMBINATIONS FOR SETTLING PHOSPHATE SLIMES

[75] Inventors: Ralph J. Chamberlain, Stamford, Conn.; Richard E. Ellwanger, Tucson, Ariz.

[73] Assignee: American Cyanamid Company, Stamford, Conn.

[21] Appl. No.: 74,464

[22] Filed: Sep. 11, 1979

Related U.S. Application Data

[63] Continuation-in-part of Ser. No. 27,626, Apr. 6, 1979, abandoned, which is a continuation of Ser. No. 833,320, Sep. 14, 1977, abandoned.

[51] Int. Cl.$^3$ ................................................ C02F 1/56
[52] U.S. Cl. ........................................ 210/727; 209/5; 210/705; 210/728
[58] Field of Search .................. 209/5; 210/42 R, 49, 210/51–54

[56] References Cited

U.S. PATENT DOCUMENTS

| 3,418,237 | 12/1968 | Booth et al. | 210/54 |
| 3,493,499 | 2/1970 | Zeitoun et al. | 210/53 |
| 3,578,586 | 5/1971 | Gal et al. | 210/51 |
| 3,680,698 | 8/1972 | Liu et al. | 210/46 |
| 3,717,574 | 2/1973 | Werneke | 210/53 |
| 3,723,310 | 3/1973 | Lang et al. | 210/53 |

*Primary Examiner*—Peter A. Hruskoci
*Attorney, Agent, or Firm*—Paul W. Leuzzi, II

[57] ABSTRACT

Phosphate slimes are effectively settled by the sequential addition of effective amounts of a low molecular weight acrylamide: acrylic acid copolymer of high anionicity and a high molecular weight acrylamide: acrylic acid copolymer of low anionicity.

7 Claims, No Drawings

ANIONIC POLYMERIC FLOCCULANT COMBINATIONS FOR SETTLING PHOSPHATE SLIMES

CROSS-REFERENCE TO RELATED APPLICATION

This application is a continuation-in-part of application Ser. No. 27,626 filed Apr. 6, 1979 now abandoned, which is a continuation of application Ser. No. 833,320 filed Sept. 14, 1977 now abandoned.

This invention relates to a process for settling solids of slimes arising from phosphate mining and processing. More particularly, this invention relates to such a process wherein the sequential addition and mixing of two different acrylamide/acrylic acid copolymers provides advantages in the total flocculant dosage required.

Waste waters, or slimes, from phosphate mining and processing operations have conventionally been stored in huge diked holding ponds covering many acres. The suspended solids in the slimes, generally about 1-3%, settle very slowly and the resulting mud remains fluid for as long as twenty years. While this type of operation ties up large land areas, there is presently no economically feasible alternative.

It is estimated that diking changes for the holding ponds are about 1.25 to 1.50 dollars per ton of slimes. An alternative treatment method must be in this cost range to be acceptable. The most efficient single polymeric flocculant is effective at a dosage level of 12 parts per million, resulting in a cost of 3.12 dollars per ton of solids, or more than double the cost of preparing diked holding ponds. Thus, although there is a potential treatment method that could be used as an alternative to diked holding tanks, the costs of such potential treatment method make it unacceptable. What is needed is an alternative treatment method which reduces the dosage of flocculants required and thereby reduces the costs of treatment so that the treatment method can be competitive to the diking procedure and result in release of the holding areas for other uses and of vitally needed water.

In accordance with the present invention, there is provided a process for settling solids of slimes arising from phosphate mining and processing which comprises first adding to and mixing with said slimes an effective amount of a first acrylamide/acrylic acid copolymer having a molecular weight of about 50,000 to 500,000 and a weight percent of acid groups or soluble salts thereof of about 60 to 100 so as to form flocs that remain suspended, then adding to and mixing with said slimes an effective amount of a second acrylamide/acrylic acid copolymer having a molecular weight of at least about 2,000,000 and a weight percent of acid groups or soluble salts thereof of about 20-60 to form settleable flocs, the weight ratio of said first to said second copolymer being about 2:1 to 1:2, and thereafter settling the flocs thus formed.

It is surprising that the use of two different polymeric flocculants of the same ionicity should provide improved results in view of the fact that prior combinations of flocculants involved different ionicities. It is also surprising that simultaneous addition of the two flocculants should produce inferior results compared to sequential addition in the order specified.

In carrying out the process of the present invention, slimes obtained from phosphate mining and processing are treated. These slimes arise, for example, in the recovery of bone phosphate of lime from the pebble rock phosphate deposits in Florida. The slimes to which the process of the present invention relates arise as the process waters used in such mining operations.

In a first step in processing the slimes, a copolymer of acrylamide/acrylic acid of molecular weight in the range of about 50,000 to 500,000 is added to and mixed with the slimes, the copolymer having a weight percent of acid groups or soluble salts thereof of about 60-100%, calculated in the acid form. A preferred copolymer has an acid group content of about 70 weight percent and a molecular weight of about 200,000. Such a copolymer can be prepared by copolymerizing appropriate amounts of acrylamide and acrylic acid to the proper degree of polymerization. Alternatively, the copolymer can be obtained by suitable hydrolysis of a homopolymer of acrylamide or other polymer which will provide the desired composition upon hydrolysis. Small amounts of other comonomers may replace a portion of the acrylamide content so long as the polymer is not adversely affected in flocculating properties.

The amount of the copolymer described to be added in the first step is that amount which is effective in providing flocs that remain suspended. Flocs that remain suspended are small and light and subsequently grow when the second flocculant is added to provide settleable flocs. The specific amount of the copolymer described to be added in the first step will vary depending upon the nature and solids content of the slime to be treated, the specific molecular weight and anionicity of the copolymer employed, the nature and amount of the second copolymer to be added, and the like. Generally, the effective amount of total flocculant usage will be in the range of about 6 to 10 parts per million parts of slimes, of which the copolymer added in the first step will constitute from 33 to 67 weight percent. It is generally desirable to use strong mixing in conjunction with the first step since it generally reduces the time necessary for completion and does not adversely affect processing.

After the first copolymer has been added and mixed with the slimes to provide flocs which remain suspended, the second step is conducted. In this step an effective amount of a copolymer of acrylamide/acrylic acid copolymer having a molecular weight of at least about 2,000,000 and a weight percent of acid groups or soluble salts thereof of about 20 to 60%, calculated in the acid form, is added to and admixed with the slimes. This second copolymer can be prepared in the same general manners and have additional comonomer content as in the case of the first copolymer, except, of course, it must satisfy the requirements of molecular weights and anionicity. A preferred second copolymer is one containing 35 weight percent acid groups and having a molecular weight of 4,000,000. Similar copolymers having molecular weights of 12,000,000 and 18,000,000 have also performed well. The second copolymer generally should be added with minimal mixing and added just before the treated slimes are advanced to the settling unit. As indicated before, the amount of second copolymer to be added will depend upon the amount of first copolymer added, the ratio of first copolymer to second copolymer being from about 2:1 to 1:2 by weight.

The anionicity of the copolymers will arise as acrylic acid groups or soluble salts thereof. Soluble salts include ammonium and alkali metal salts.

After the second copolymer has been added to and mixed with the slimes, settleable flocs will form. Accordingly, after the second step is completed, the slimes are subjected to settling. Such settling can be carried out in any convenient manner, such as in a thickener, clarifier, or holding pond. The flocs will rapidly settle and the supernatant can be drawn off as a clear reuseable process water or discarded into the environment safely.

The process of the present invention enables the slimes resulting from phosphate mining and processing to be settled in an economically feasible manner and thus offers an attractive alternative to diking ponds and the vast land areas tied up by such procedure. The use of the low-cost highly anionic low molecular weight copolymer in the first step of the present invention not only reduces the cost of the flocculants use but also reduces the total flocculant dosage required, thus offering a two-fold advantage in processing.

The invention in more fully illustrated by the examples which follow wherein all parts and percentages are by weight unless otherwise specified. The general test procedure in evaluating in settling phosphate slimes used in the examples which follow is next described.

GENERAL TEST PROCEDURE

Slimes

A suitable quantity of fresh slimes was taken daily for flocculant screening. The solids content of the slimes was determined by heating a weighed sample to dryness.

Flocculant Evaluation

A one-liter graduated cylinder was filled to the one-liter mark with fresh slime. The flocculant under test in approximate amount was added to the cylinder and mixed with the slimes using a plunger type stirrer. Agitation requirements to obtain thorough mixing vary with individual flocculants. After thorough mixing was achieved, the treated slurry was allowed to settle and the time required for 100 ml. of clear supernatant was determined. An effective flocculant was considered to be one in which the time for 100 ml. of clear supernatant to appear was less than four minutes.

To ascertain the effective dosage level for effective flocculation as defined above was determined by running a series of tests on a given flocculant at different concentrations.

COMPARATIVE EXAMPLE A

Following the general procedure described above, a copolymer of acrylamide and acrylic acid having a molecular weight of molecular weight 12,000,000 and a weight percent of acid groups of 35 was evaluated alone at different concentrations. The minimum dosage for effective flocculation was determined to be 12 parts per million parts of slime.

COMPARATIVE EXAMPLE B

Again, following the general procedure, a copolymer of acrylamide and acrylic acid having a molecular weight of 200,000 and a weight percent of acid groups of 70 was evaluated at different concentrations. This polymer was ineffective as a flocculant alone at all practical dosage levels.

EXAMPLE 1

Following the general procedure described above, there were first added to and mixed with the slimes the copolymer of Comparative Example B at 5 ppm. After thorough mixing, there were next added 3 ppm of the copolymer of Comparative Example A. After mixing, effective flocculation was achieved. After the first addition, it was not that small flocs which remained suspended had formed. After the second addition, large settleable flocs rapidly formed. This example shows that the combination of low molecular weight copolymer of high anionicity with the high molecular weight copolymer of low anionicity provides effective flocculation at lower dosage than does either of the copolymers used alone.

COMPARATIVE EXAMPLE C

The general procedure was again followed. In this run, 5 ppm of the copolymer of Comparative Example B and 3 ppm of the copolymer of Comparative Example A were first mixed together and then simultaneously added to the slimes. Effective flocculation was not obtained. This example shows the importance of sequential addition of the two copolymer flocculants.

COMPARATIVE EXAMPLE D

In this run, the procedure of Example 1 was followed except that the order of flocculant addition was reversed. The high molecular weight copolymer of low anionicity was added first and then the low molecular polymer of high anionicity was added, the amounts being as in Example 1. Effective flocculation was not obtained. This example shows that the correct order of copolymer addition must be followed to obtain effective flocculation.

EXAMPLE 2

The procedure of Example 1 was followed except that the second copolymer added had a molecular weight of 4,000,000. Effective flocculation was obtained.

EXAMPLE 3

The procedure of Example 1 was again followed except that the second copolymer added had a molecular weight of 18,000,000. Effective flocculation was obtained.

EXAMPLE 4

The procedure of Example 1 was again followed except that the total dosage of the two copolymers was increased to 9 ppm with the ppm of the individual copolymers being as given below in the various runs indicated:

TABLE I

| Run No. | Copolymer Comp. Ex. B ppm | Copolymer Comp. Ex. A ppm | Flocculation |
| --- | --- | --- | --- |
| 1 | 8 | 1 | Not effective |
| 2 | 7 | 2 | Not effective |
| 3 | 6 | 3 | Effective |
| 4 | 5 | 4 | Effective |
| 5 | 4 | 5 | Effective |
| 6 | 3 | 6 | Effective |
| 7 | 2 | 7 | Not effective |
| 8 | 1 | 8 | Not effective |

COMPARATIVE EXAMPLE E

Following the general procedure described above, a copolymer of acrylamide and acrylic acid having a molecular weight of about 12,000,000 and a weight percent of acid groups of 35 was evaluated in the concentrations set forth in Table II. After thorough mixing was achieved, the treated slurry was allowed to settle and the time required for 100 ml. of clear supernatant to form was determined. Test results are given in Table II.

TABLE II

| Acrylamide/Acrylic Acid Copolymer with a Molecular Weight of 12,000,000 and a 35 Weight Percent of Acid Groups | |
|---|---|
| Total Dosage PPM Slimes Slurry | Settling Rate (Sec.) |
| 6 | 1200 |
| 9 | 365 |
| 15 | 165 |
| 21 | 65 |
| 24 | 35 |

EXAMPLE 5

Following the general procedure described above, a one-liter graduated cylinder was filled to the one-liter mark with the fresh slimes and a copolymer of acrylamide and acrylic acid having a molecular weight of about 200,000 and a weight percent of acid groups of 70 was first added in the amounts shown in Table III. A plunger type stirrer was used to mix the slimes with the flocculant. After thorough mixing was achieved, a second addition was undertaken employing a copolymer of acrylamide and acrylic acid having a molecular weight of about 12,000,000 and a weight percent of acid groups of 35 in the amounts shown in Table III. Again a plunger type stirrer was used to thoroughly mix the slimes with the flocculant. The treated slurry was allowed to settle and the time required for 100 ml. of clear supernatant to form was determined. Test results are given in Table III.

TABLE III

| Sequential Addition of Copolymer Flocculants | | | |
|---|---|---|---|
| Total Dosage PPM Slimes Slurry | Copolymer A* Dosage PPM Slimes Slurry | Copolymer B** Dosage PPM Slimes Slurry | Settling Rate (Sec.) |
| 6 | 2 | 4 | 225 |
| 6 | 4 | 2 | 135 |
| 9 | 3 | 6 | 62 |
| 9 | 6 | 3 | 107 |
| 15 | 5 | 10 | 55 |
| 15 | 10 | 5 | 20 |
| 21 | 7 | 14 | 58 |
| 21 | 14 | 7 | 17 |
| 24 | 8 | 16 | 51 |
| 24 | 16 | 8 | 17 |

*Copolymer A - Acrylamide/acrylic acid copolymer with a molecular weight of 200,000 and a 70 weight percent of acid groups.
**Copolymer B - Acrylamide/acrylic acid copolymer with a molecular weight of 12,000,000 and a 35 weight percent of acid groups.

EXAMPLE 6

Following the general procedure described above, there were first added to and mixed with the slimes the copolymer of Comparative Example B at 8 ppm. After thorough mixing, there were next added, in the dosages set forth in Table IV, a copolymer of acrylamide and acrylic acid having a molecular weight of about 12,000,000 and a weight percent of acid groups of about 53. Again, thorough mixing was accomplished. The treated slurry was allowed to settle for 10 minutes. The resulting clear supernatant recovered is given in Table IV.

TABLE IV

| Copolymer A* Dosage ppm Slimes Slurry | Copolymer C*** Dosage ppm Slimes Slurry | ml. supernatant |
|---|---|---|
| 8 | 6.0 | 115 |
| 8 | 6.7 | 165 |
| 8 | 7.5 | 255 |
| 8 | 9.0 | 275 |

*Copolymer A - Acrylamide/acrylic acid copolymer with a molecular weight of 200,000 and a 70 weight percent of acid groups
***Copolymer C - Acrylamide/acrylic acid copolymer with a molecular weight of 12,000,000 and a 53 weight percent of acid groups.

EXAMPLE 7

When the procedure of Example 1 is followed in every material detail, except that the copolymer of acrylamide and acrylic acid having a molecular weight of 200,000 has a weight percent of acid groups of 90 and the copolymer of acrylamide and acrylic acid having a molecular weight of 12,000,000 has a weight percent of acid groups of 25, effective flocculation was obtained.

We claim:

1. A process for settling solids of the slimes arising from phosphate mining and processing which comprises first adding to and mixing with said slimes an effective amount of a first acrylamide/acrylic acid copolymer flocculant having a molecular weight of about 50,000 to 500,000 and a weight percent of acid groups or soluble salts thereof of about 60 to 100 so as to form flocs which remain suspended, then adding to and mixing with said slimes an effective amount of a second acrylamide/acrylic acid copolymer flocculant having a molecular weight of at least about 2,000,000 and a weight percent of acid groups or soluble salts thereof of about 20 to 60 to form settleable flocs, the weight ratio of said first to said second copolymer being from about 2:1 to 1:2, and thereafter settling the flocs thus formed.

2. The process of claim 1 wherein said first copolymer has a molecular weight of 200,000 and a weight percent of acid groups or soluble salt thereof of 70.

3. The process of claim 1 wherein said second copolymer has a molecular weight of 4,000,000 and a weight percent of acid groups or soluble salts thereof of 35.

4. The process of claim 1 wherein said second copolymer has a molecular weight of 12,000,000 and a weight percent of acid groups or soluble salts thereof of 35.

5. The process of claim 1 wherein said second copolymer has a molecular weight of 18,000,000 and a weight percent of acid groups or soluble salts thereof of 35.

6. The process of claim 1 wherein the total amount of said first and said second flocculant is 6 to 10 parts per million parts of slimes.

7. The process of claim 1 wherein the weight ratio of said first to said second copolymer is 1.67:1.

* * * * *